United States Patent [19]

Frisk

[11] Patent Number: 4,955,556
[45] Date of Patent: Sep. 11, 1990

[54] SHOULDER HARNESS REEL ASSEMBLY WITH AUTOMATIC REEL LOCK

[75] Inventor: Don L. Frisk, Yorba Linda, Calif.

[73] Assignee: PZF, Inc., Yorba Linda, Calif.

[21] Appl. No.: 304,342

[22] Filed: Jan. 30, 1989

Related U.S. Application Data

[62] Division of Ser. No. 103,414, Oct. 1, 1987, Pat. No. 4,801,105.

[51] Int. Cl.$^5$ .............. B60R 22/38; G05G 1/00
[52] U.S. Cl. .............. 242/107.4 B; 74/577 S; 74/577 M
[58] Field of Search .......... 242/107.4 A, 107.4 B; 280/806; 297/478, 480; 74/575, 576, 577 R, 577 M, 577 S, 577 SF; 188/82.7, 82.74, 82.77

[56] References Cited

U.S. PATENT DOCUMENTS

| | | | |
|---|---|---|---|
| 1,110,802 | 9/1914 | Ledeboer | 74/577 S |
| 2,084,803 | 6/1937 | Hart | 74/577 S |
| 3,100,609 | 8/1963 | Wrighton | 242/107.4 B |
| 3,178,136 | 4/1965 | Bayer | 242/107.4 B X |
| 3,189,296 | 6/1965 | Wrighton et al. | 242/107.4 B |
| 3,917,189 | 11/1975 | Bryll | 242/107.4 B |
| 3,944,164 | 3/1976 | Tibbe | 242/107.4 A |
| 4,029,267 | 6/1977 | Slipper | 242/107.4 A |
| 4,183,260 | 1/1980 | Wagner et al. | 74/576 |

Primary Examiner—John M. Jillions
Attorney, Agent, or Firm—Edgar W. Averill, Jr.

[57] ABSTRACT

An improved dog used with a ratchet which is subject to rapid withdraw which dog has a biased probe extending outwardly from the ratchet contacting face of the dog. The biased probe reduces or eliminates the tendency of the dog to bounce along the teeth of the ratchet when the ratchet is rapidly turning.

2 Claims, 7 Drawing Sheets

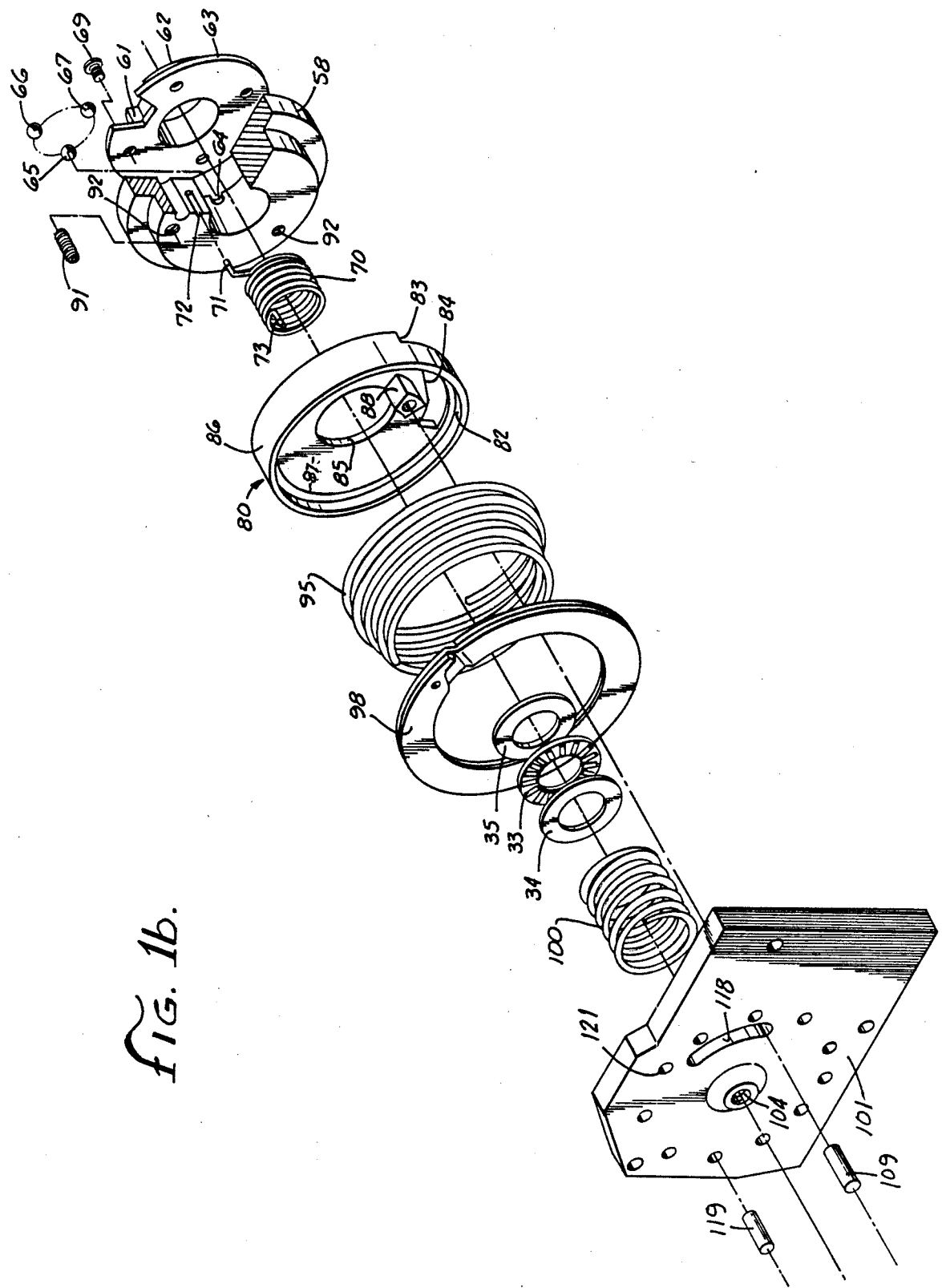

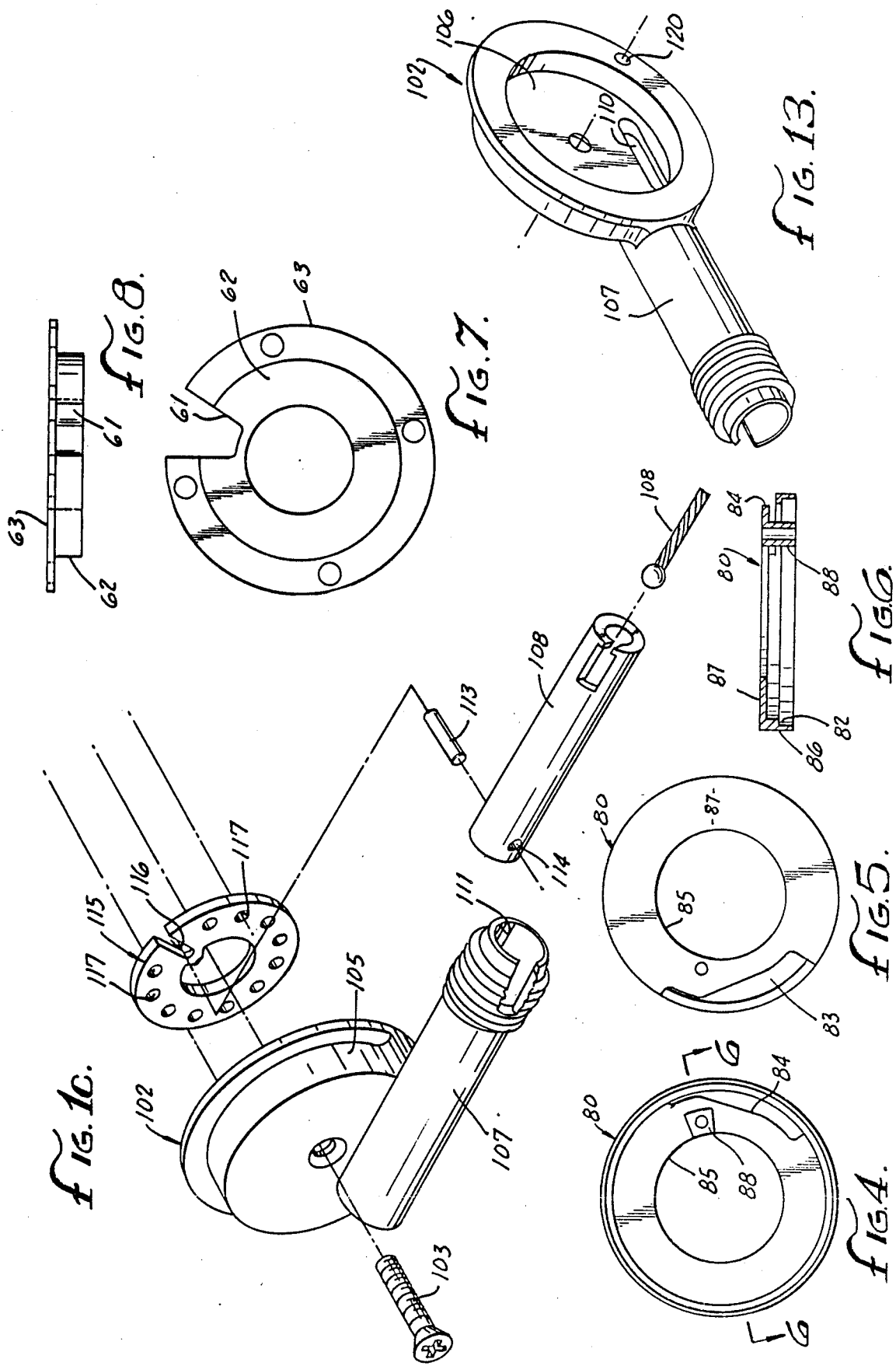

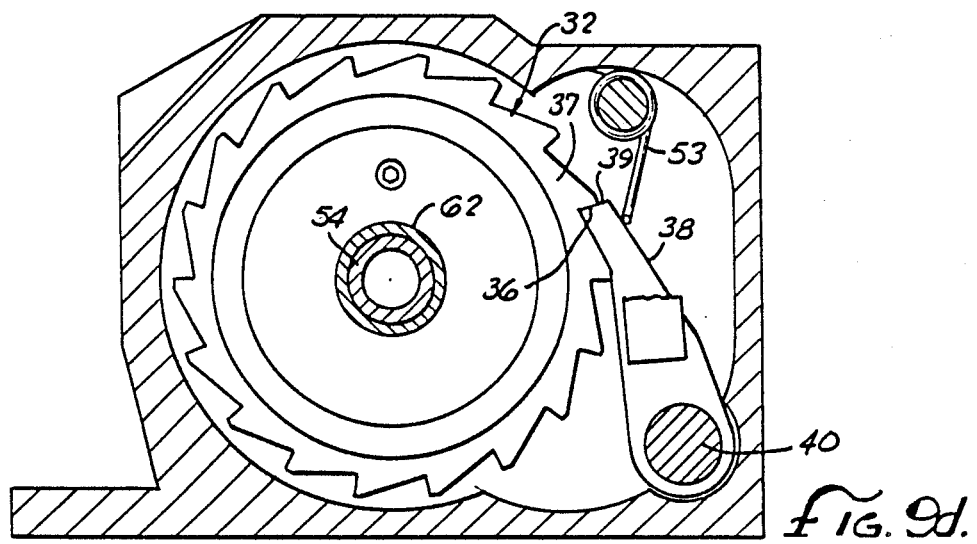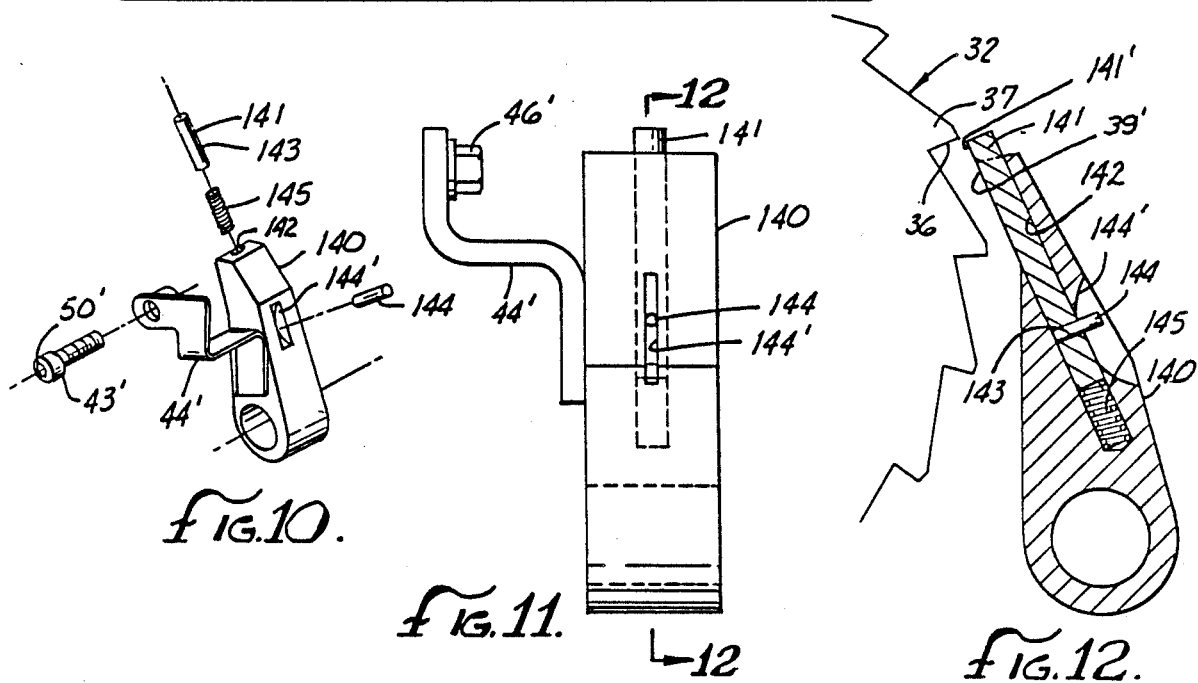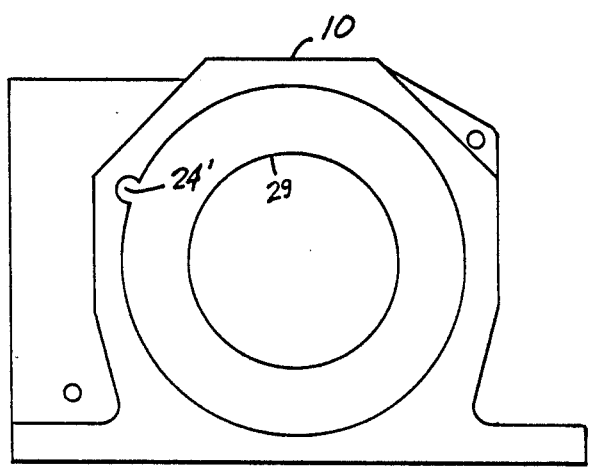

4,955,556

SHOULDER HARNESS REEL ASSEMBLY WITH AUTOMATIC REEL LOCK

This is a division, of application Ser. No. 103,414, filed Oct. 1, 1987 now U.S. Pat. No. 4,801,105.

BACKGROUND OF THE INVENTION

The field of the invention is seatbelts of the type used in automobiles and aircraft, and the invention relates more particularly to reels of the type which permit the person who is strapped in the seat to move with relative freedom until the reel is locked. Upon sudden stopping, or other motion which causes a rapid withdrawal of the strap, the reel locks. One reel assembly of the type used by pilots is manufactured by Pacific Scientific and operates by the relative movement of a flywheel with respect to a thrust plate. Three ball bearings are held in indentations in the flywheel and when the reel is moved rapidly, the flywheel lags behind the reel thus forcing the ball bearings out of the indentations and tripping a dog which stops the movement of a reel by engaging a ratchet wheel. The device is reset by reseating the balls, thus again holding the dog away from the ratchet wheel. This device has a very large number of parts and a number of these parts are used to prevent tripping by vibration and by the rapid retraction of the belt.

An inertia wheel was also used in the automobile seatbelt retraction wheel shown in U.S. Pat. No. 3,323,749. In this device, a nut moves upwardly and engages teeth on a cap when the belt is rapidly withdrawn from the reel. The device resets itself by gravity as a result of the weight of the nut. Such device would not be useful in aircraft since it relies on gravity and the position of an aircraft is not always horizontal.

Many reel assemblies of the type used in military aircraft must be manually reset once tripped. For some applications, it is beneficial to perform the resetting step automatically without the need for manual resetting.

SUMMARY OF THE INVENTION

It is an object of the present invention to provide an improved reel assembly which permits movement of the strap supported by the reel but which locks when the strap is rapidly extended from the wheel.

It is a further object of the present invention to provide a reel assembly for retracting and locking a shoulder harness which will operate in any position.

The present invention is for an improved reel assembly of the type used for retracting and locking a shoulder harness. The assembly is of the type which includes a housing which rotatably supports a strap supporting spool affixed to a ratchet wheel which is rotatable about its axis. A releasable dog is provided for stopping the turning of the reel when the strap is rapidly pulled from the reel. The improvement of the present invention comprises a generally cylindrical, inertia mass wheel support shaft affixed to the ratchet wheel so that its central axis lies along the central axis of the ratchet wheel. An inertia mass wheel affixed on the support arm moves with the reel during relatively slow withdrawal of the strap. However, when the strap is rapidly pulled from the reel, the inertia mass lags behind the support shaft. A plurality of ball bearings ride in thread means between the inertia mass wheel and the support shaft so that this relative movement causes the inertia mass to move outwardly away from the ratchet wheel. A sear is supported within the housing and is contacted by the inertia mass when it moves away from the ratchet wheel. This trips a dog which locks the ratchet wheel preventing further withdrawal of the strap. The amount of movement of the inertia mass is only a matter of 0.040 inches, and thus the belt is capable of locking before the strap has been withdrawn more than about 0.5 inches.

Preferably, the inertia mass is rewound by a calibration spring affixed between the inertia mass and its support shaft. Once the inertia mass has been rewound, the reel assembly can be reset. In a preferred embodiment, this resetting is brought about by the rotation of a dog extractor which moves the dog outwardly from the ratchet wheel, and the dog is held in its outward position by contact with the sear. Of course, when the sear is again moved outwardly by the outward movement of the inertia mass, the dog, once again, contacts the ratchet wheel.

BRIEF DESCRIPTION OF THE DRAWINGS

FIGS. 1a, 1b and 1c are an exploded, perspective view of the improved reel assembly of the present invention.

FIG. 4 is a front view of the sear member of the reel assembly of FIG. 1.

FIG. 5 is a back view of the sear member of the reel assembly of FIG. 1.

FIG. 6 is a cross-sectional view taken along line 6-6 of FIG. 4.

FIG. 7 is a rear view of the ball retainer of the inertia mass of the reel assembly of FIG. 1.

FIG. 8 is a top view of the ball retainer of the inertia mass of the reel assembly of FIG. 1.

FIG. 9d is a front view showing the housing, ratchet and dog of the reel assembly of FIG. 1 with the dog in a locked position as taken along line 9d—9d of FIG. 3.

FIG. 10 is an exploded, perspective view of the dog assembly of the reel assembly of FIG. 1.

FIG. 11 is an enlarged front view of the dog assembly of the reel assembly of FIG. 1.

FIG. 12 is a cross-sectional view taken along line 12—12 of FIG. 11.

FIG. 13 is a perspective view showing the inner face of the control head of the assembly of FIG. 1.

FIG. 14 is a rear view of the housing of FIG. 1a.

FIG. 15 is an exploded, perspective view of an alternate embodiment of the improved reel assembly of the present invention.

FIG. 16 is a front view showing the dog, dog extractor and sear of the reel assembly of FIG. 15.

FIG. 17 is an enlarged cross-sectional plan view of the reel assembly of FIG. 15.

DESCRIPTION OF THE PREFERRED EMBODIMENTS

Figure 1A:
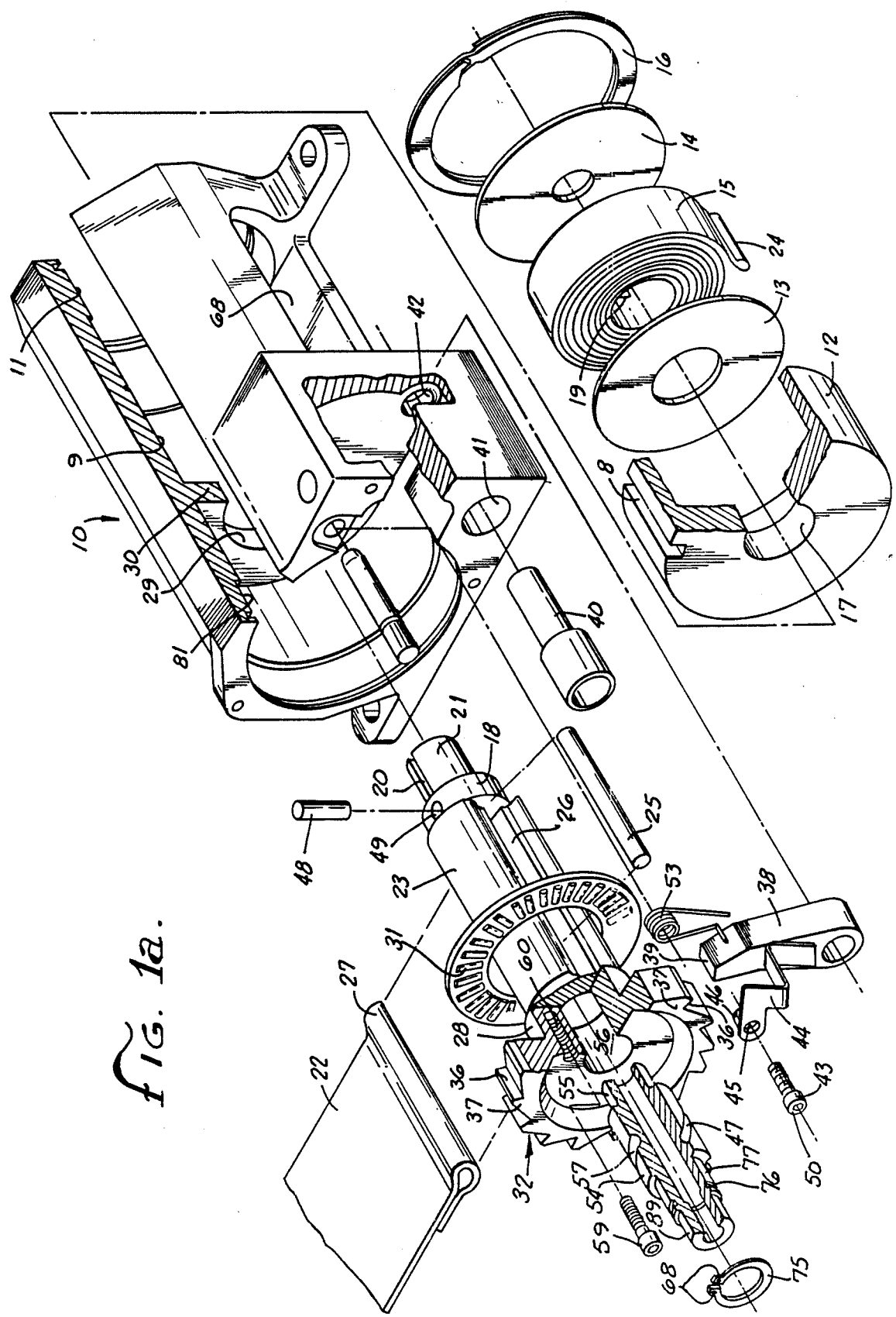

The reel assembly of the present invention is shown in exploded, perspective view in FIGS. 1a, 1b and 1c. The reel assembly is contained within a housing 10 which may be cast or machined typically from aluminum. Housing 10 has a power spring compartment 11 which holds the power spring assembly. The power spring assembly includes a spring housing 12, a pair of spring retainers 13 and 14 and a power spring 15. The spring housing 12 is held in housing 10 by a locking ring 16. Spring housing 12 has an inner bearing surface 17 which supports the bearing surface 18 of the reel assembly in a manner more particularly described below. Power spring 15 has an inner claw 19 which is held by a power spring slot 20 formed in shaft 21. As the strap 22 is withdrawn from strap supporting spool 23, the power spring 15 is wound. The outer claw, or outer loop 24, passes through an opening 8 in spring housing 12 and is held in a recess 24, in housing 10, which recess is shown in FIG. 14. In that way, the spring housing 12 is prevented from turning within the power spring compartment 11. Conversely, as the outward force is reduced on strap 22, power spring 15 unwinds pulling strap 22 further around strap supporting spool 23. Pin 48 fits through a pair of holes 49 formed through bearing surface 18 which is hollow. In that way, a tool may be inserted through the hollow end of shaft 21 and contact pin 48 thus allowing the tool to turn the power spring slot 20 to wind power spring 15. After winding, the strap 22 may be inserted through cavity 26 and held in place by the insertion of rod 25. This may be accomplished by the opening 68 in housing 10 through which strap 22 extends. Strap 22 is held in reel 23 in a conventional manner by the interaction of a rod 25 which has been inserted in a loop 27 formed in the end of the strap 22 after the loop has been passed through cavity 26. The rod 25, of course, is too large to be pulled through cavity 26 and, thus, the end of strap 22 is securely held in the strap supporting spool 23.

Strap supporting spool 23 is also held within the housing by a second bearing surface 28 which is supported by a second inner bearing surface 29 formed in partition 30. Partition 30 forms the forward end of spool housing 9 which is between partition 30 and power spring compartment 11. Also, a pair of needle thrust bearings, one of which is shown in FIG. 1a and indicated by reference character 31, prevents the axial movement of strap supporting spool 23 as well as ratchet wheel 32. The second needle thrust bearing is indicated by reference character 33 and is shown in FIG. 1b. A pair of bearing races 34 and 35 surrounds bearing 33.

The turning of strap supporting spool 23 may be stopped by the contact of the face of one of the teeth of ratchet wheel 32 with releasable dog 38. For instance, face 36 of tooth 37 will contact end 39 of releasable dog 38 when dog 38 is released. End 39 is a ratchet contacting face. Dog 38 is held on a dog shaft 40 which, in turn, is held in holes 41 and 42 near the base of housing 10. Dog 38 has a dog post 43 which is held to dog 38 by dog post arm 44 which is spot welded to dog 38. The relative position of dog post tip 50 is adjustable with respect to releasable dog 38 by bending dog post arm 44. A clinch nut 46 secures dog post 43 in threaded opening 45. A dog spring 53 contacts releasable dog 38 near its end 39 which provides a secured force to bias dog 38 toward the teeth of ratchet wheel 32.

An inertia mass support shaft 54 has a shaft portion 55 which is press fit into opening 56 in ratchet wheel 32. Support shaft 54 has a 45 degree groove which comprises thread means and which is indicated by reference character 57. The angle of the thread is not critical, but it should be a relatively steep slope, for instance between 30 degrees and 60 degrees, so that the inertia mass will have a significant axial movement with a small amount of rotation. Inertia mass support shaft 54 holds an inertia mass wheel 58 shown in FIG. 1b. Inertia mass wheel 58 also has thread means comprising three ball bearings described in further detail below. An inertia mass wheel stop post 59 is held in the threaded opening 60 in ratchet wheel 32. Stop post 59 limits the movement of inertia mass wheel 58 to a small arc. The amount of the arc is indicated by the size of groove 61 (see FIG. 1b and also FIGS. 7 and 8) formed in hub 62 of ball retainer 63. The groove 61 and stop post 59 permit a relative movement of only about 15 to 20 degrees of the inertia mass wheel 58 with respect to ratchet wheel 32. Because groove 57 has a relatively steep ramp such as 45 degrees, this small degree of turn is still sufficient to trip the releasable dog in the manner described more fully below.

As shown in FIG. 1b, inertia mass wheel 58 has a cavity 64 formed therein into which steel ball 65 is held. Two additional cavities (not shown) hold steel balls 66 and 67. These steel balls ride in the three grooves, such as groove 57, (shown in FIG. 1a) formed in inertia mass support shaft 54. A second groove is indicated by reference character 47 in FIG. 1a. This provides a low friction contact between inertia mass wheel 58 and inertia mass support shaft 54. Steel balls 65, 66 and 67 are held in their respective cavities by ball retainer 63. Ball retainer 63 is held to inertia mass wheel 58 by a plurality of screws such as screw 69.

Inertia mass wheel 58 normally turns with ratchet wheel 32 as strap 22 of the shoulder harness is pulled out from the strap supporting spool 23 during the normal movement of the pilot or other wearer. As ratchet wheel 32 turns, the inertia mass stop post 59 is held against an edge of groove 61 as a result of the turning force of calibration spring 70 whose inner end 71 is held in hole 72 in inertia mass wheel 58. The outer end 73 of spring 70 is held between the ears 68 of a standard snap ring 75 (shown in FIG. 1a) which is held in a groove 76 in shaft 77 of inertia mass support shaft 54. In this way, the ratchet wheel is biased with respect to the inertia mass wheel 58 and the inertia mass stop post 59 is held against one edge of groove 61. However, as the speed with which strap 22 is withdrawn from spool 23 increases, the inertia lag of inertia mass wheel 58 becomes sufficiently strong so that it overcomes the force applied by calibration spring 70 and turns with respect to ratchet wheel 32. In so doing, it moves outwardly, away from ratchet wheel 32 and trips the releasable dog in a manner described below. The harness wheel of the present invention is designed to lock when the strap accelerates at a 3G level. The stiffness of the calibration spring 70 can be varied to increase or decrease the amount of acceleration which results in a locking.

Figure 2:
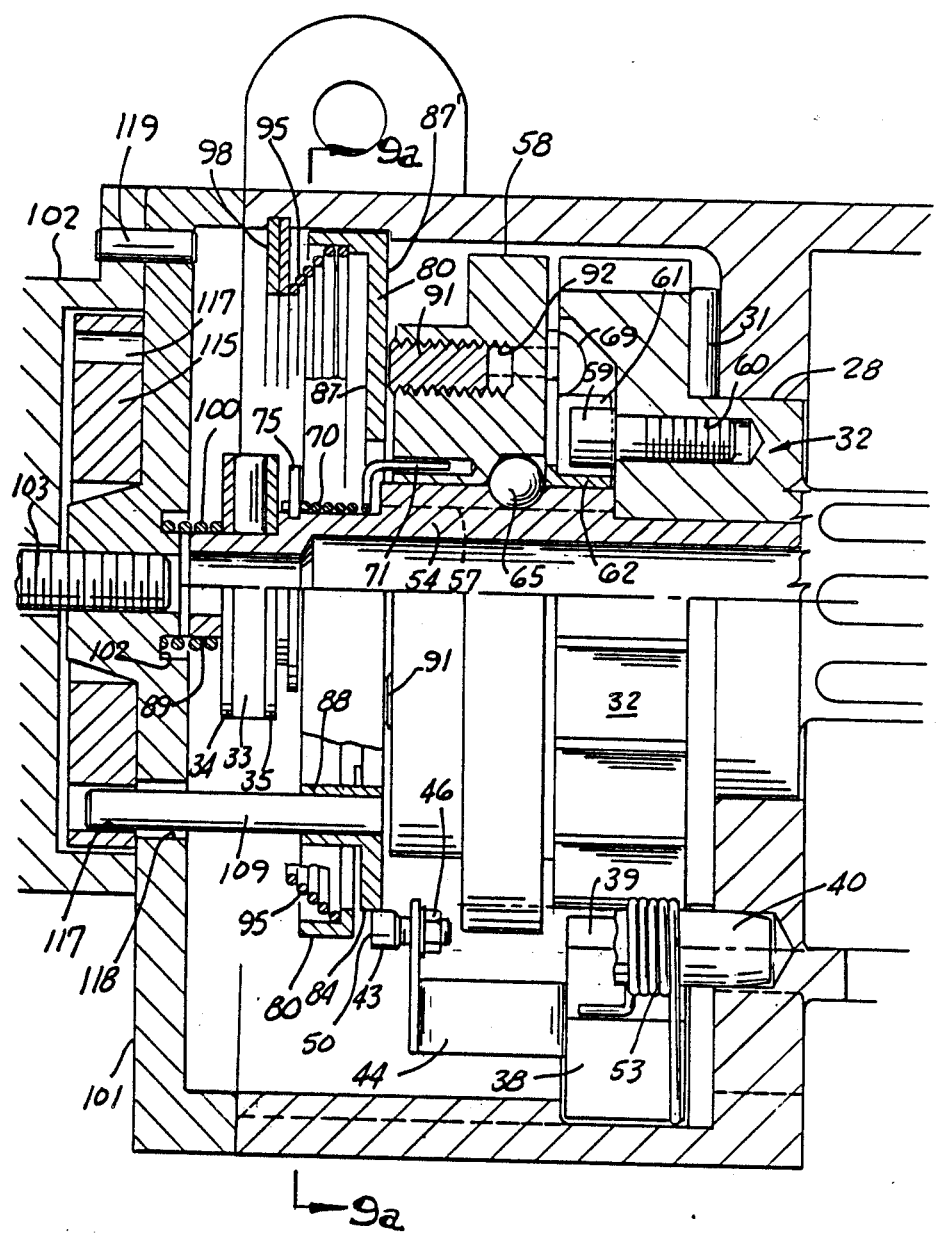
FIG. 2 is a top view, partly in cross-section, of the reel assembly of FIG. 1 with the ratchet wheel in an unlocked configuration.
Figure 3:
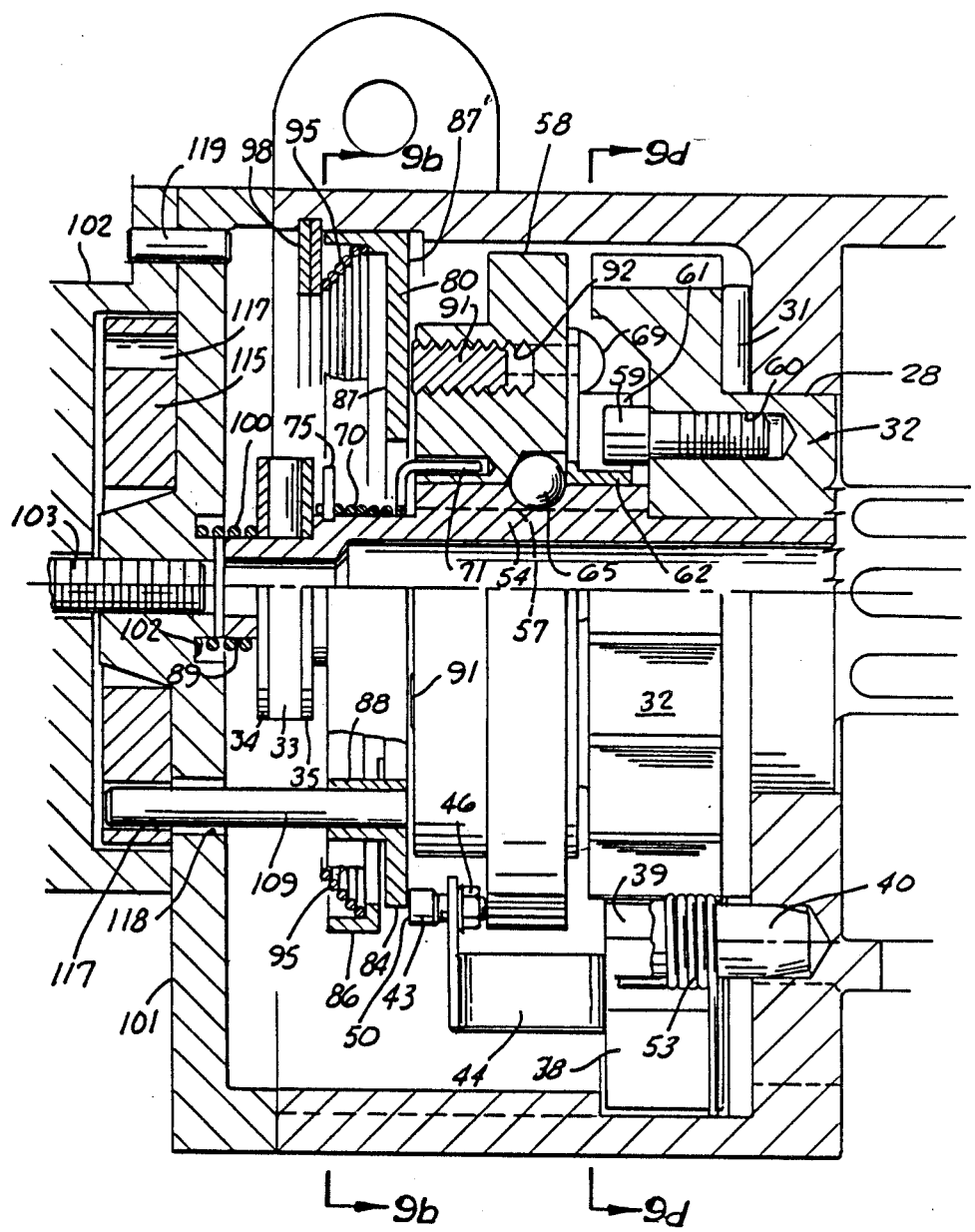
FIG. 3 is a top view, partly in cross-section, of the reel assembly of FIG. 1 with the ratchet wheel in a locked configuration.

The tripping of releasable dog 38 is brought about by the movement of sear 80 which is held in sear compartment 81 of housing 10 (see FIG. 1a). This is also shown in FIGS. 2 and 3 where it can be seen that sear 80 is held within sear compartment 81 by an outer locking ring 98 which, in turn, supports sear spring 95 which urges the sear 80 in the direction of inertia mass wheel 58. Sear spring 95 is held in a sear spring recess 82 formed in the inner surface of sear 80. The detail of construction of the sear 80 is shown best in FIGS. 4, 5 and 6 where it can be seen that the sear is comprised of a flat disk 87 surrounded by an outer ring 82. A cam surface 84 is formed from a portion of flat disk 87.

In operation, as strap 22 is rapidly pulled from strap supporting spool 23, the inertia mass 58 lags behind the inertia mass support shaft 54 and the thread means comprising ball bearings 65, 66 and 67 ride along the grooves such as grooves 57 and 47 and cause the inertia mass to move away from ratchet wheel 32 and into contact with sear 80. Inertia mass wheel 58 has three contact points 91 which are held in threaded openings 92 (two of which are shown in FIG. 1b). As also shown in FIG. 2, these contact points 91 are held a small distance from the inner face 87 of sear 80 when the dog is in its retracted position as indicated in FIG. 2. Preferably, contact points 91 are adjustable so that they may be accurately set to be a small distance such as 0.005 to 0.010 inches from inner face 87 of Sear 80. The dog post 43 contacts the cam surface 84 which thus holds dog 38 away from ratchet wheel 32. The rapid withdrawal of strap 22 causes inertia mass to move toward sear 80, thus causing contact points 91 to touch inner face 87 of sear 80 and move sear 80 away from dog post 40. This movement is shown in FIG. 3 where it can be seen that dog post 43 has fallen off of cam surface 84 permitting dog 38 to move inwardly and into contact with ratchet wheel 32 preventing any further outward movement. This movement is very rapid and the strap will lock after a very short outward pull such as one-half of an inch thereby securing the pilot before any significant outward movement of the strap.

As is clear in FIG. 3, the dog post tip 50 abuts the inner face 87 of sear 80 holding it in an outward position. Meanwhile, calibration spring 70 causes inertia mass wheel 58 to rewind back to the position shown in FIG. 2. The sear, however, is still held in its outward position, shown in FIG. 3, until it is reset in the manner indicated by FIGS. 9a, 9b and 9c.

Figure 9A:
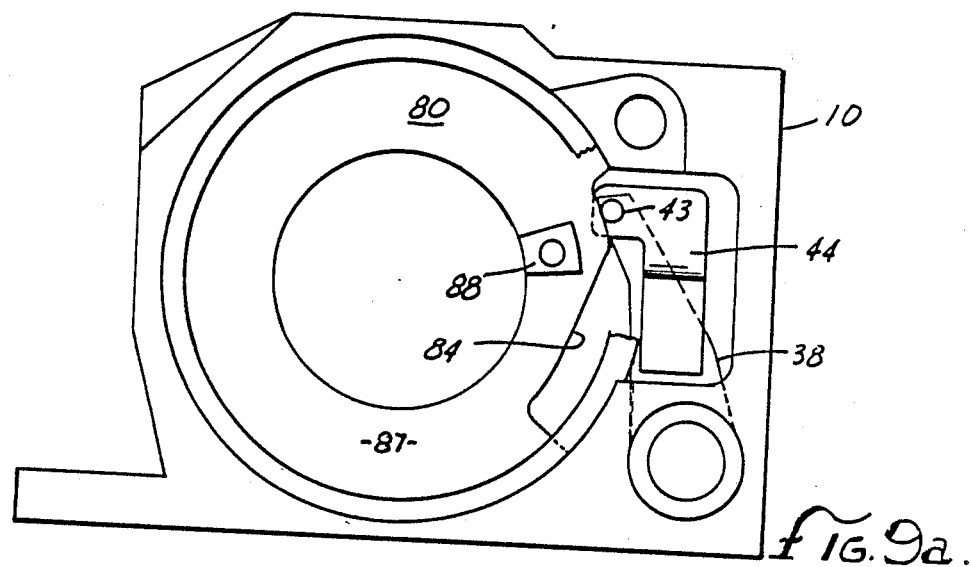
FIG. 9a is a front view showing the housing, sear and dog of the reel assembly of FIG. 1 showing the dog in an unlocked position as taken along line 9a—9a of FIG. 2.
Figure 9B:
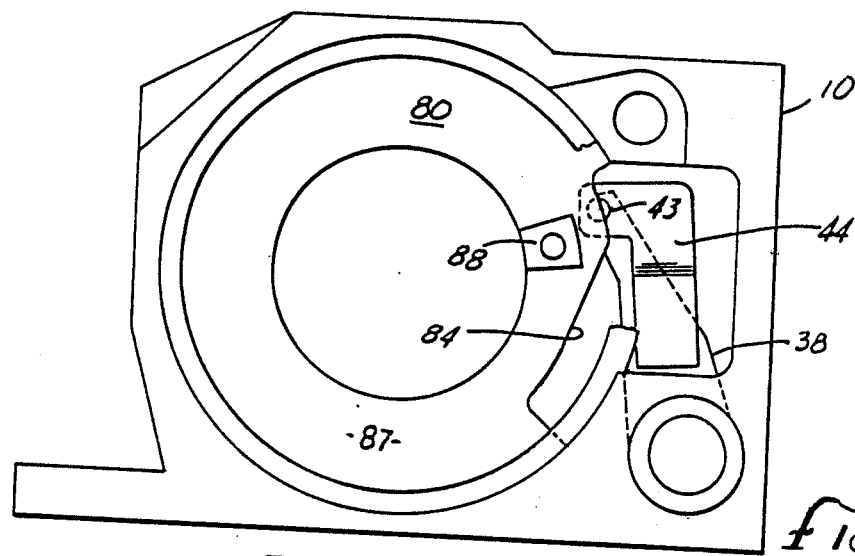
FIG. 9b is a front view showing the housing, sear and dog of the reel assembly of FIG. 1 showing the dog in a locked position as taken along line 9b—9b of FIG. 3.

As shown in FIG. 9a, the dog is held in its open position which permits the free movement of belt 22 from spool 23. After the rapid extraction of the belt has pushed the sear away from the direction of the ratchet wheel, the dog is in its locked position as shown in FIG. 9b. The dog is reset by a turning cycle of the sear caused by the moving back and forth of control post 109 which is held in control post support 88. The dog post cam surface 84 is held in a cutout portion 83 of the sear and as the control post causes the sear to turn in a counter-clockwise direction to the position shown in FIG. 9c, the dog post tip 50 clears the dog cam surface 84 and permits sear 80 to move back in its retracted position closer to ratchet wheel 32. The control post 109 is then moved in a clockwise direction from the position shown in FIG. 9c to the position shown in FIG. 9b. However, since the sear has moved into its retracted position, dog post 43 now contacts cam surface 84 and as the clockwise turning is made, dog post 43 moves outwardly thereby moving dog 38 to its open position as shown in FIG. 9a. The contact position of dog 38 is shown best in FIG. 9d where it can be seen that the end 39 of dog 38 contacts face 36 of tooth 37 thereby securely preventing any further withdrawal of belt 22.

Figure 9C:
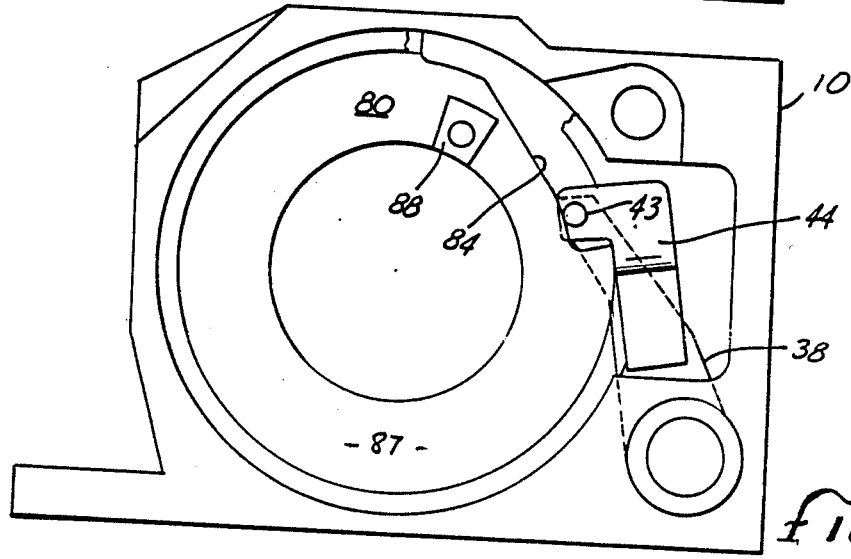
FIG. 9c is a front view showing the housing, sear and dog of the reel assembly of FIG. 1 showing the sear rotated into a position to reset or unlock the dog.

Another feature of the moving of sear 80 by control post 109 may be understood by a view of FIG. 9c. When the control post holds the sear in the position of FIG. 9c, the dog 38 is retained in a contact position and thus the belt is in a manually locked configuration. In this position, no outward movement of the strap is permitted.

Several other construction features are shown in FIGS. 2 and 3. A spool positioning spring 100 surrounds shaft 89 and abuts race 34 at one end and is held in a recess 102 formed in cover 101. Spring 100 tends to urge the ratchet wheel 32 against needle thrust bearing 31 and holds the strap supporting spool 23 in a fixed axial position.

A preferred construction of the dog is shown in FIGS. 10, 11, and 12. In the past, there [was occasionally a problem with an extremely rapid withdrawal of the strap 22, that the releasable dog 28 would bounce along the outer surface of the teeth of ratchet wheel 32 resulting in the harness strap extending when conditions called for a "locked configuration." In order to prevent this occurrence, the configuration shown in FIGS. 10, 11 and 12 provides a means to time the entry of the dog into engagement with a tooth of the ratchet wheel. If the dog has time to make a complete engagement of the tooth, the dog is allowed to drop. If not, the dog is held up by probe 141 until the next tooth comes around. Probe 141 then cams down the back of the tooth. Probe 141 is held in an opening 142 in releasable dog 140 has a ratchet directed edge closest to the ratchet. The ratchet directed edge is aligned with the ratchet directed face 39' of dog 38 as shown in FIG. 12. Probe 141 includes a hole 143 in which a pin 144 is held. Pin 144 rides in slot 144' formed in dog 140. Probe 141 is urged outwardly by spring 145 which is held at the base of opening 142. The outward movement of probe 141 is limited by the contact of pin 144 with the upper edge of slot 144'. The dog post arm 44', dog post 43', dog post tip 50' and clinch nut 46' are the same as that referred to above in connection with dog 38. Control post 109 may be moved through its arc by several means. One such means is indicated in FIGS. 1b and 1c. Cover 101 is securely bolted to housing 10 and supports a control head 102 by means of a screw 103 which is held in a threaded opening 104 in cover 101. Control head 102, shown in perspective view in FIGS. 1c, has a generally cylindrical body 105 which has a central recess 106 shown in FIG. 13. The central opening 111 of hollow shaft 107 supports control rod 108 in a slideable manner. Control rod 108 is caused to move back and forth by a control cable 108'. A control pin 113 extends through slot 110 and is held by control rod 108 in opening 114 thereof. Control pin 113 extends from slot 110 into slot 116 of adapter ring 115. The control post 109 then may be held by any of the openings 117 in adapter ring 115. In that way, the hollow shaft 107 may be positioned in any of eleven positions corresponding to the eleven openings indicated by reference character 117. Control pin 113 is always held in slot 116 but the control post 109 may be in any of the eleven positions. Control post 109 extends through slot 118 shown in FIG. 1b. A pin 119 may be placed in any of the eleven holes 121 in cover 101 so that the control head 102 is held in a preferred orientation. Pin 119 is held in hole 120 shown in FIG. 13. Of course, to control the position of sear 80, the control rod 108 is moved back and forth and control pin 113 causes adapter ring 115 to turn within central recess 106. Control post 109, being securely held in one of the openings 117, then moves through an arc in slot 119 and thus causes the control post support 88 of sear 80, and thus sear 80, to move through the same arc. This movement can cause the dog 38 to be held in a manually locked position, as indicated in FIG. 9c, or in automatic position as shown in FIG. 9a.

An alternate means for tripping and resetting dog 38 is shown in FIGS. 15, 16 and 17. In this configuration, the dog may be automatically reset without the need for oscillating a sear to force the dog away from contact with ratchet wheel 32.

Inertia mass wheel 200 is similar to inertia mass wheel 58 in that it has a hole 72 for the inner end 71 of calibration spring 70. It also has three cavities 64 in which balls 65, 66 and 67 are held by ball retainer 63. A groove 61 similarly limits the movement of inertia mass wheel 200 in a manner identical to that for inertia mass wheel 58. A hub 201 holds a locking actuator 202 which may be formed from stainless steel, aluminum or a polymer. Locking actuator 202 is used to deflect a control spring as the inertia mass wheel is moved forward by the turning of inertia mass support shaft 54 shown in FIG. 1a.

The dog 38 is identical to dog 38 of FIG. 1a and has an identical dog post arm 44 and ratchet contacting face 39. It has a ratchet directed face 39' which is directed toward the ratchet as shown in FIG. 12. A dog spring 53, likewise, is the same as that shown in FIG. 1a. The dog post 203 is held on dog post arm and supports a control spring mount 204. The opening 205 is slightly larger than the shaft of dog post 203 and, thus, control spring mount 204 is free to rotate about dog post 203. A spring opening 206 is shown in phantom view and holds the dog end 207 of control spring 208. The supported end 209 of control spring 208 is held in control spring mount 210 which, in turn, is held to control spring support 211 by mounting post 212. The shaft of mounting post 212 is, likewise, smaller than the opening 213 in control spring mount 210 so that mount 210 is free to turn about mounting post 212. Similarly, an opening 214 is formed in spring mount 210 and holds supported end 209 of control spring 208. Mounting post 212 is held in a threaded opening 215 formed in control spring support 211. Control spring support 211 has an outer ring 216 which is securely held by outer locking ring 98 as shown best in FIG. 17. There is, of course, no movement of control spring support 211 during the operation of this version of locking mechanism. A cover 218 abuts the spool positioning spring 100 in a recess 219. A cutout 217 is formed in control spring support 211 to permit the movement of control spring mount 204 therein (as seen best in FIG. 16).

In operation, when strap 22 is rapidly withdrawn from spool 23, inertia mass support shaft 54 turns so that balls 65 through 67 cause inertia mass wheel 200 to move outwardly toward cover 218. Of course, locking actuator 202 also moves outwardly and contacts control spring 208 near its middle point as shown in FIG. 16. With control spring 208 in its straightened position, as shown in FIG. 16, dog 38 is held away from ratchet wheel 32. Dog spring 53 places a force along control spring 208 which provides substantial resistance to the dog position post 203. Control spring 208 is a closewound spring and, therefore, functions like a column. As control spring 208 is contacted by actuator 202, it bends to the position indicated by reference character 220 (in FIG. 16). This reduces the resistance to inward movement of dog position post 203 and allows dog spring 53 to move dog 38 into contact with ratchet wheel 32. As long as there is any outward force on strap 22, dog 38 stays in its locked position and control spring 202 stays in its locked position 220. However, as the outward pull on strap 22 is eliminated, power spring 15 causes ratchet wheel 32 to begin to pick up on strap 22. This causes dog 38 to be moved outwardly by contact with a tooth, such as tooth 37, of ratchet wheel 32. This tends to begin to straighten control spring 208 and as it is straightened, its tendency to return to its straight position is strong enough to overcome dog spring 53 and it thus snaps back into unlocked position 221. Thus, the dog is automatically reset to an unlocked position which permits the slow withdrawal of strap 22. This unlocking is done without any conscious effort of the pilot, or other wearer, yet the belt stays in a locked position as long as there is any outward force at all on the belt since dog spring 53 overcomes control spring 208 when the dog is in its fully locked position. Additional means could be added to cause a manual lock but such means are not shown in the drawings. Of course, calibration spring 70 rewinds inertia mass wheel 200 to return locking actuator 202 to its inward, or withdrawn, position.

The sensitivity of the device of FIGS. 14 through 16 may be varied by the alignment of mounting posts 203 and 212 with respect to the central or longitudinal axis of control spring 208. This central axis of control spring 208 is indicated by reference character 222. It can be seen that central axis 222 does not pass through the central axis of mounting post 203 and 212 but, instead, is somewhat outward as compared to the central axis of the inertia mass support shaft 54. By further increasing this distance which is indicated by reference character 223 in the drawings, the sensitivity of the device can be increased. Conversely, by decreasing the distance such as aligning the central axis 222 with the center of support supports 203 and 212, the sensitivity is decreased.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved dog of the type used with a ratchet, which ratchet is subject to rapid withdrawal, said dog having a pivot point at its base and a ratchet contacting face at the tip thereof and a ratchet directed face extending generally in the direction of the pivot point from the edge of the ratchet contacting face, said dog including biasing means urging said dog in the direction that causes said ratchet contacting face to contact a ratchet wherein the improvement including means to reduce or eliminate the tendency of the tip to bounce along the teeth of the ratchet when it is rapidly turning, said improvement comprising:

a biased probe extending outwardly from the ratchet contacting face, said biased probe having a ratchet directed edge closest to the ratchet and the ratchet directed edge being aligned with the ratchet directed face of the dog and said biased probe being inwardly movable into said dog so that its tip is in line with the ratchet contacting face whereby a timed entry of the dog into contact with a ratchet occurs in that if the dog has time to make a complete engagement with a ratchet tooth, it is allowed to drop but if it does not, the dog is held up by said probe until the next tooth comes around.

2. The improved dog of claim 1 wherein said biased probe extends over only a portion of said ratchet contacting face so that the ratchet is stopped by contact with the ratchet contacting face rather than with the biased probe.

* * * * *